United States Patent
Chen

(10) Patent No.: US 6,406,393 B1
(45) Date of Patent: Jun. 18, 2002

(54) PRESSING DEVICE OF TRANSMISSION BELT OF ELECTRIC CART

(75) Inventor: Tsang-Ying Chen, Chang Hua Hsien (TW)

(73) Assignee: Melton International L.L.C., Dover, DE (US)

( * ) Notice: Subject to any disclaimer, the term of this patent is extended or adjusted under 35 U.S.C. 154(b) by 0 days.

(21) Appl. No.: 09/741,055

(22) Filed: Dec. 21, 2000

(51) Int. Cl.⁷ .................................................. F16H 7/12
(52) U.S. Cl. ...................... 474/135; 474/101; 474/115; 74/137
(58) Field of Search ............................ 74/136, 137, 138, 74/139–141; 474/101, 135, 136, 137, 138, 115, 133

(56) References Cited

U.S. PATENT DOCUMENTS

| | | | | |
|---|---|---|---|---|
| 4,761,155 A | * | 8/1988 | Kinoshita et al. | 474/104 |
| 4,869,707 A | * | 9/1989 | in 't Zandt et al. | 399/107 |
| 5,120,277 A | * | 6/1992 | Georget et al. | 474/117 |
| 5,901,791 A | * | 5/1999 | Ichikawa et al. | 172/125 |

* cited by examiner

Primary Examiner—Pam Rodriguez
(74) Attorney, Agent, or Firm—Browdy and Neimark

(57) ABSTRACT

A device is designed to press the transmission belt of an electric cart and is formed of a pivot set, a first swiveling member, a second swiveling member, a first wheel set, a second wheel set, and an elastic element. The first and the second swiveling members are pivoted with the pivot set such that they are located at two sides of the transmission belt. The first and the second wheel sets are provided with one or more rollers which are pivoted to the first and the second swiveling members. The rollers come in contact with the transmission belt to enhance the transmission effect of the transmission belt. The elastic element provides the first and the second swiveling members with a spring force enabling them to swivel toward the transmission belt.

10 Claims, 3 Drawing Sheets

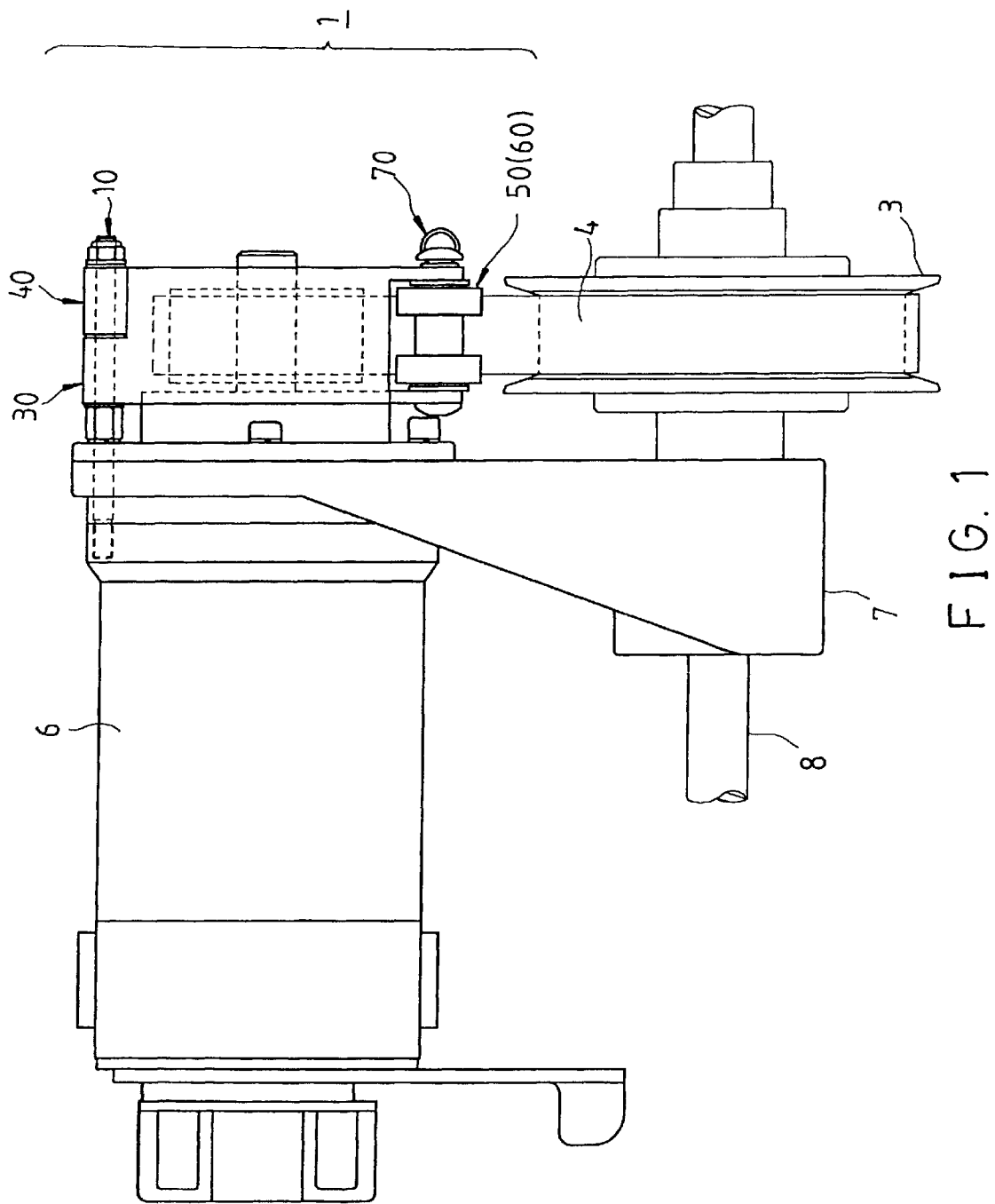
F I G. 1

PRESSING DEVICE OF TRANSMISSION BELT OF ELECTRIC CART

FIELD OF THE INVENTION

The present invention relates generally to a transmission belt of the electric cart, and more particularly to a pressing device of the transmission belt of the electric cart.

BACKGROUND OF THE INVENTION

The conventional transmission device is provided with an idle wheel to hold the transmission belt, so as to improve the transmission effect between a drive wheel and a driven wheel. The idle wheel is in fact ineffective in holding the transmission belt.

SUMMARY OF THE INVENTION

The primary objective of the present invention is to provide a device capable of pressing effectively the transmission belt of an electric cart. The device comprises a pivot set, a first swiveling member, a second swiveling member, a first wheel set, a second wheel set, and an elastic element. The first and the second swiveling members are pivoted to the pivot set such that they are located at two sides of the transmission belt. The first and the second wheel sets are provided with at least one roller which is pivoted to the first or the second swiveling member. The rollers come in contact with the transmission belt. The elastic element serves to provide the first and the second swiveling members with a spring force enabling the first and the second swiveling member to swivel toward the transmission belt.

BRIEF DESCRIPTION OF THE DRAWINGS

FIG. 1 shows a side view of a preferred embodiment of the present invention.

DETAILED DESCRIPTION OF THE INVENTION

Figure 2:
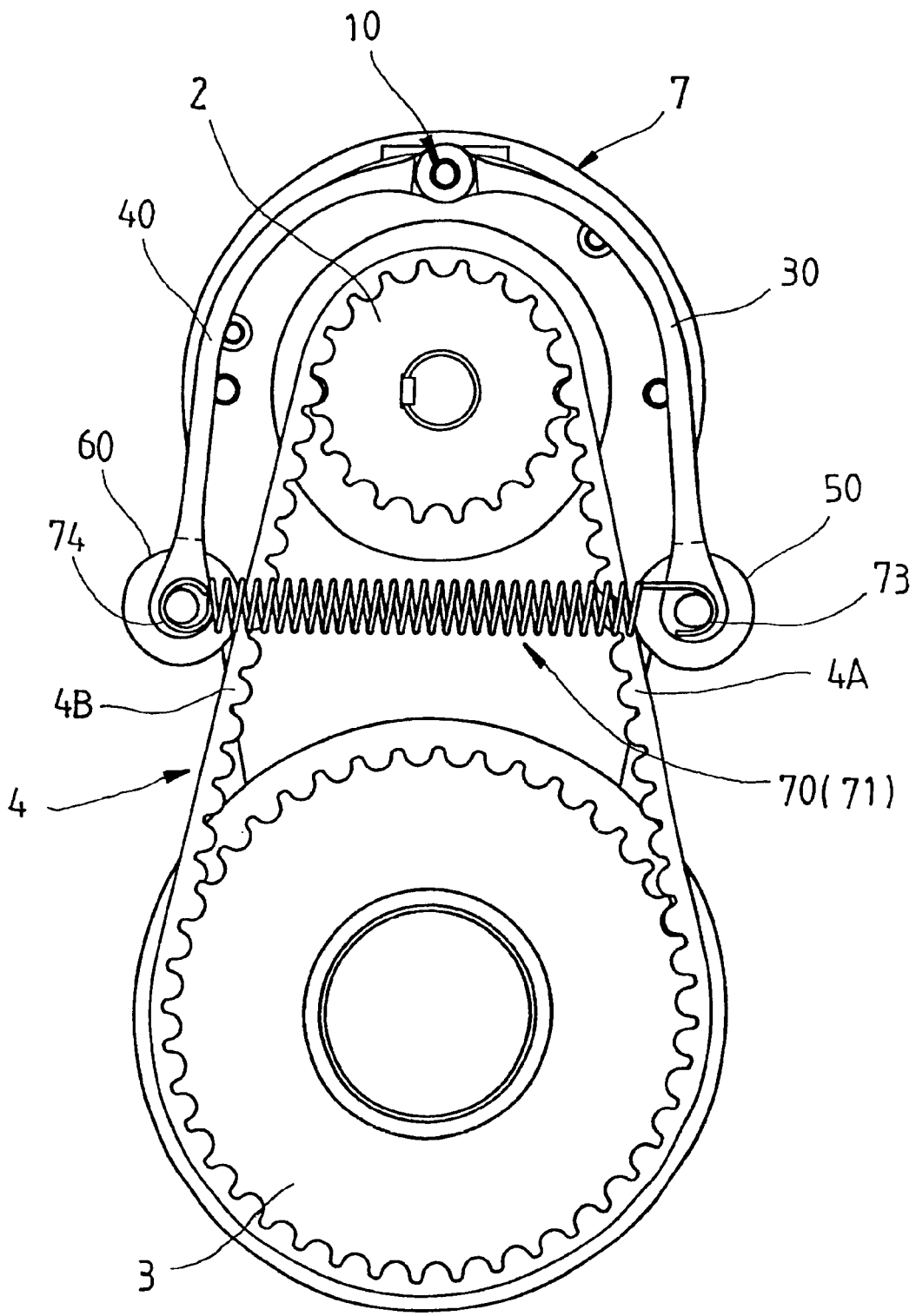
FIG. 2 shows a right view of the preferred embodiment of the present invention.
Figure 3:
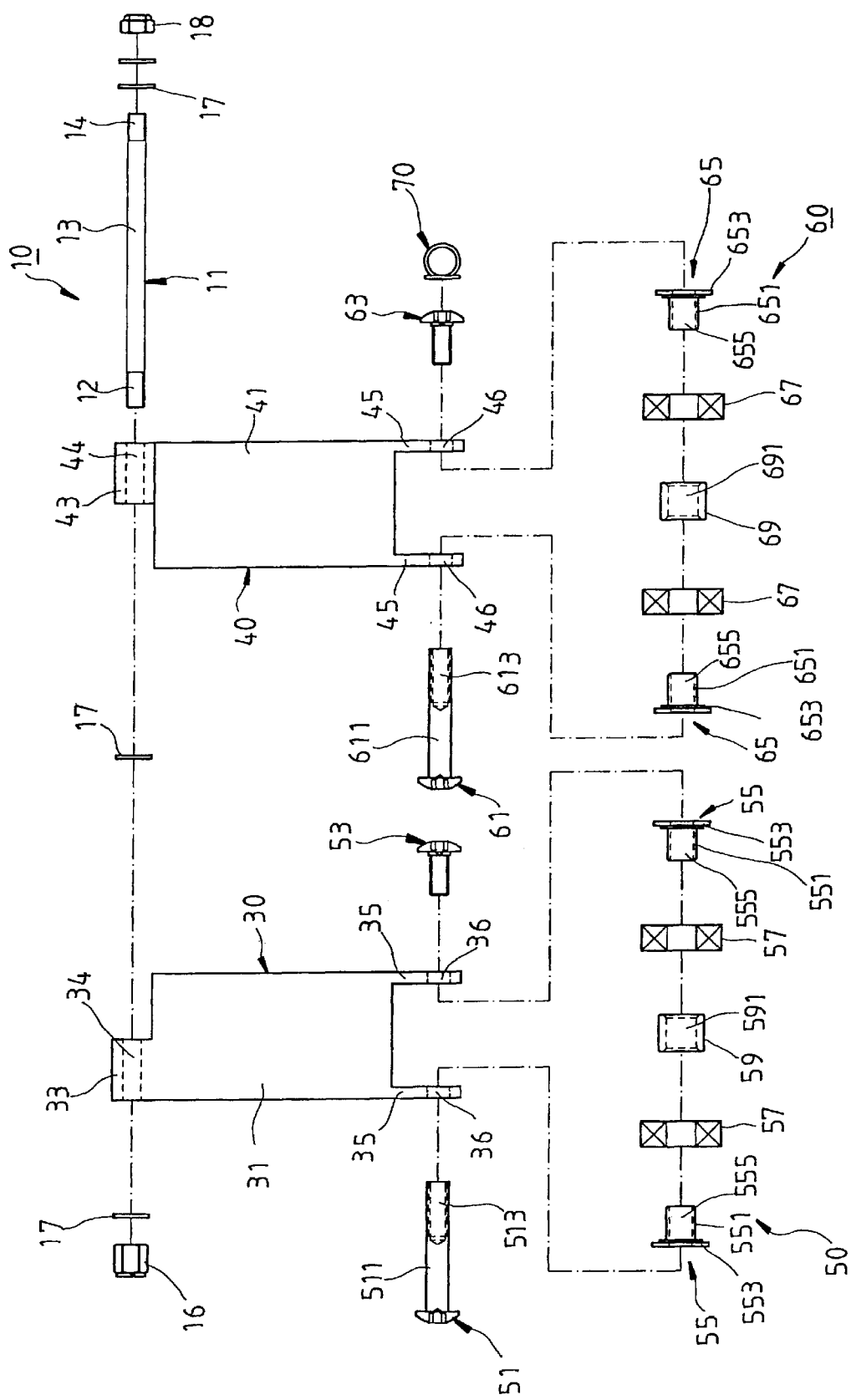
FIG. 3 shows an exploded view of the preferred embodiment of the present invention.

As shown in FIGS. 1–3, a pressing device 1 embodied in the present invention is intended to hold a transmission belt 4 which is used to transmit motion from a drive wheel 2 to a driven wheel 3.

The drive wheel 2 is connected to a motor 6 which is provided with a fastening mount for pivoting the driven wheel 3. The driven wheel 3 is connected with an axle 8. The transmission belt 4 is disposed between the drive wheel 2 and the driven wheel 3 and is provided with a first side 4A and a second side 4B.

The pressing device 1 comprises the component parts, which are described hereinafter.

A pivot set 10 has a fixation rod 11 which is provided with a threaded portion 12 engaging the drive wheel 2, a pivoting rod 13 fastened with one end of the fixation rod 11, a threaded rod 14 located at the end of the fixation rod 11, a separation ring 16 disposed at the pivoting rod 13, four washers 17 fitted over the pivoting rod 13, and a nut 18 engaged with the threaded rod 14.

A first swiveling member 30 is located at one side of the belt 4 and is provided with an arcuate piece 31, and a rod pivoting portion 33 having a pivoting hole 34 for pivoting the pivoting rod 13 of the pivot set 10. The first swiveling member 30 is further provided with two wheel pivoting portions 35 which are corresponding in location to the first side 4A of the belt 4 and are provided with a wheel pivoting hole 36.

A second swiveling member 40 is symmetrical to the first swiveling member 30 and is located at other side of the belt 4. The second swiveling member 40 has a piece body 41, a rod pivoting portion 43, a rod pivoting hole 44, two wheel-pivoting portions 45 and two wheel-pivoting holes 46.

Two first wheel sets 50 have a pivoting rod 51 with a rod body 511 having a threaded hole 513, a bolt 53 engaged with the threaded hole 513 of the pivoting rod 51, two shaft liners 55 having a pivoting portion 551, a shoulder 553 and a pivoting hole 555 for pivoting the rod body 511 of the pivoting rod 51, two bearings 57 mounted respectively on the pivoting portions 551 of the shaft liners 55, and a separation ring 59 provided with an inner hole 591 and disposed between the two bearings 57.

The second wheel sets 60 are pivoted to the second swiveling member 40 and provided with a pivoting rod 61 having a rod body 611 and a threaded hole 613, a bolt 63, two shaft liners 65 having a pivoting portion 651, a shoulder 653 and a pivoting hole 655, two bearings 67, and a separation ring 69. The bearings 67 come in contact with the belt 4.

A tension spring 70 has a main body 71 which is provided with a first hooked portion 73 and a second hooked portion 74, which are engaged with the bolts 57 and 67, for providing the swiveling members 30 and 40 with a spring force.

As shown in FIG. 2, the first and the second swiveling members 30 and 40 are caused by the tension spring 70 to swivel toward the corresponding sides 4A and 4B of the belt 4, thereby causing the bearings 57 and 67 of the first and the second wheel sets 50 and 60 to come in contact with the belt 4. In light of the first and the second. swiveling members 30 and 40 being acted on by the same tension spring 70, the transmission belt 4 is in a good contact with the drive wheel 2 and the driven wheel 3, thereby resulting in an excellent transmission effect.

The first and the second wheel sets 50 and 60 may be provided with the bushings in place of the bearings 57 and 67. The present invention may be also provided with a torsion spring in place of the tension spring. The torsion spring is fitted over the rod pivoting portion of the pivot set.

What is claimed is:

1. A pressing device of a transmission belt of an electric cart, said device comprising:

a pivot set located at the outer side of the belt;

a first swiveling member pivoted to said pivot set and located at one side of the belt, said first swiveling member having a wheel pivoting portion;

a second swiveling member pivoted to said pivot set having a wheel pivoting portion;

a first wheel set having at least one roller which is pivoted with said wheel pivoting portion of said first swiveling member such that said roller comes in contact with one side of the belt;

a second wheel set having at least one roller which is pivoted with said wheel pivoting portion of said second swiveling member such that said roller of the second wheel set comes in contact with the other side of the belt; and an elastic element for providing a spring force to enable said first swiveling member and said second swiveling member to swivel toward the belt, thereby causing said rollers of said first wheel set and said second wheel set to press against the belt.

2. The device as defined in claim 1, wherein said elastic element is a tension spring.

3. The device as defined in claim 1, wherein said elastic element is a torsion spring.

4. The device as defined in claim 1, wherein said wheel pivoting portion of said first swiveling member and said second swiveling member is two in number.

5. The device as defined in claim 1, wherein said roller of said first wheel set and said second wheel set is a bearing.

6. The device as defined in claim 1, wherein said roller of said first wheel set and said second wheel set is a bushing.

7. The device as defined in claim 1, wherein said roller of said first wheel set and said second wheel set is two in number.

8. The device as defined in claim 7, wherein both sets said two rollers are provided with a separation ring disposed therebetween.

9. The device as defined in claim 1, wherein said first wheel set and said second wheel set are each provided with a pivoting rod for pivoting each said roller, and with a bolt engaged with each said pivoting rod.

10. The device as defined in claim 1, wherein said first wheel set and said second wheel set are each provided with a shaft liner for pivoting each said roller.

* * * * *